United States Patent [19]

Schneider et al.

[11] E Re. 31,532

[45] Reissued Mar. 6, 1984

[54] PRIMARY CELLS AND IODINE CONTAINING CATHODES THEREFOR

[75] Inventors: Alan A. Schneider, Baltimore, Md.; James R. Moser, Shrewsbury, Pa.

[73] Assignee: Catalyst Research Corporation, Baltimore, Md.

[21] Appl. No.: 270,216

[22] Filed: Jun. 3, 1981

Related U.S. Patent Documents

Reissue of:

[64] Patent No.: 3,674,562
Issued: Jul. 4, 1972
Appl. No.: 106,657
Filed: Jan. 15, 1971

[51] Int. Cl.[3] ..... H01M 6/18

[52] U.S. Cl. ..... 429/191; 429/199; 429/213; 429/218

[58] Field of Search ..... 429/212, 213, 191, 101, 429/199, 218

[56] References Cited

U.S. PATENT DOCUMENTS

| | | | |
|---|---|---|---|
| 3,057,760 | 10/1962 | Dereska et al. | 429/110 |
| 3,352,720 | 11/1967 | Wilson et al. | 429/213 |
| 3,421,947 | 1/1969 | Wisdom et al. | 429/199 |
| 3,455,742 | 7/1969 | Rao | 429/191 |
| 3,582,404 | 6/1971 | Blackburne et al. | 429/191 |
| 3,660,164 | 5/1972 | Hermann et al. | 429/213 X |

OTHER PUBLICATIONS

Gutmann et al., J. Electrochem. Soc., 114, pp. 323–324, (1967).

*Primary Examiner*—Anthony Skapars
*Attorney, Agent, or Firm*—Pennie & Edmonds

[57] ABSTRACT

A mixture of iodine with a poly-2-vinylpyridine.$I_2$ or a poly-2-vinylquinoline.$I_2$ charge transfer complex is an improved cathode material of a plastic state and in conjunction with a metal anode, for example lithium, provides primary cells with improved capacity and performance characteristics.

12 Claims, 3 Drawing Figures

PRIMARY CELLS AND IODINE CONTAINING CATHODES THEREFOR

Matter enclosed in heavy brackets [ ] appears in the original patent but forms no part of this reissue specification; matter printed in italics indicates the additions made by reissue.

The invention herein described was made in the course of or under a contract or subcontract thereunder with The Department of the Army.

This invention relates to primary cells having charge transfer complex cathodes and more particularly to new and improved iodine-containing cathode material and to cells having a metal anode and a cathode of the new cathode material.

Cells utilizing iodine-containing charge transfer complexes as cathodes and having anodes of certain divalent metals or silver have been disclosed by Gutman et al., J. Electrochem. Soc. 114, 323 (1967) and ibid. 115, 359 (1968). In the copending application of James R. Moser, Ser. No. 41,801 filed June 1, 1970, there are as disclosed high voltage, high energy density batteries having a lithium anode and iodine-containing cathodes, including organic-iodine charge transfer complexes.

It is an object of this invention to provide a new and improved iodine-containing cathode composition that has a high proportion of electrochemically available iodine and a high electronic conductivity over a wide range of iodine content. Another object is to provide such cathode compositions in a solid, plastic state. Another object is to provide cells and batteries having a metal anode and a cathode of the new compositions. Still another object is to provide a stable, long-lived, high energy density, high voltage battery especially useful for long life, low current drain applications. Another object is to provide such a battery having a lithium anode and a cathode of the new composition. Other objects will be apparent from the following description and claims.

Figure 1:
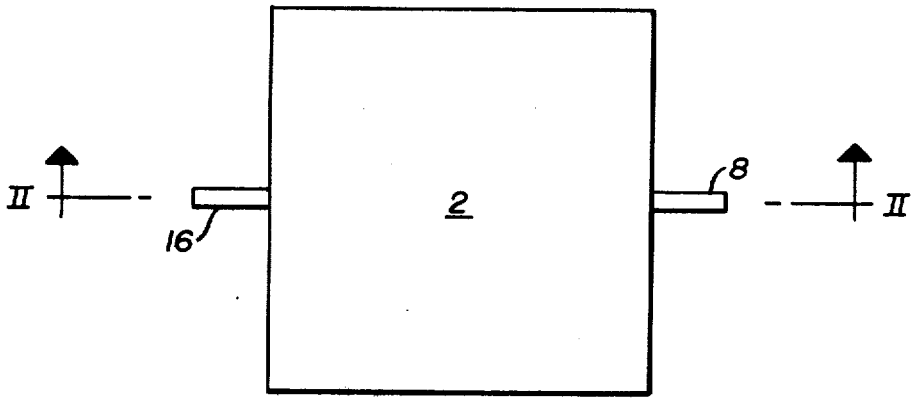
Figure 2:
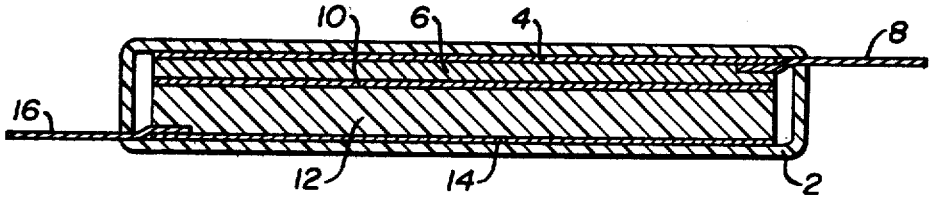
Figure 3:
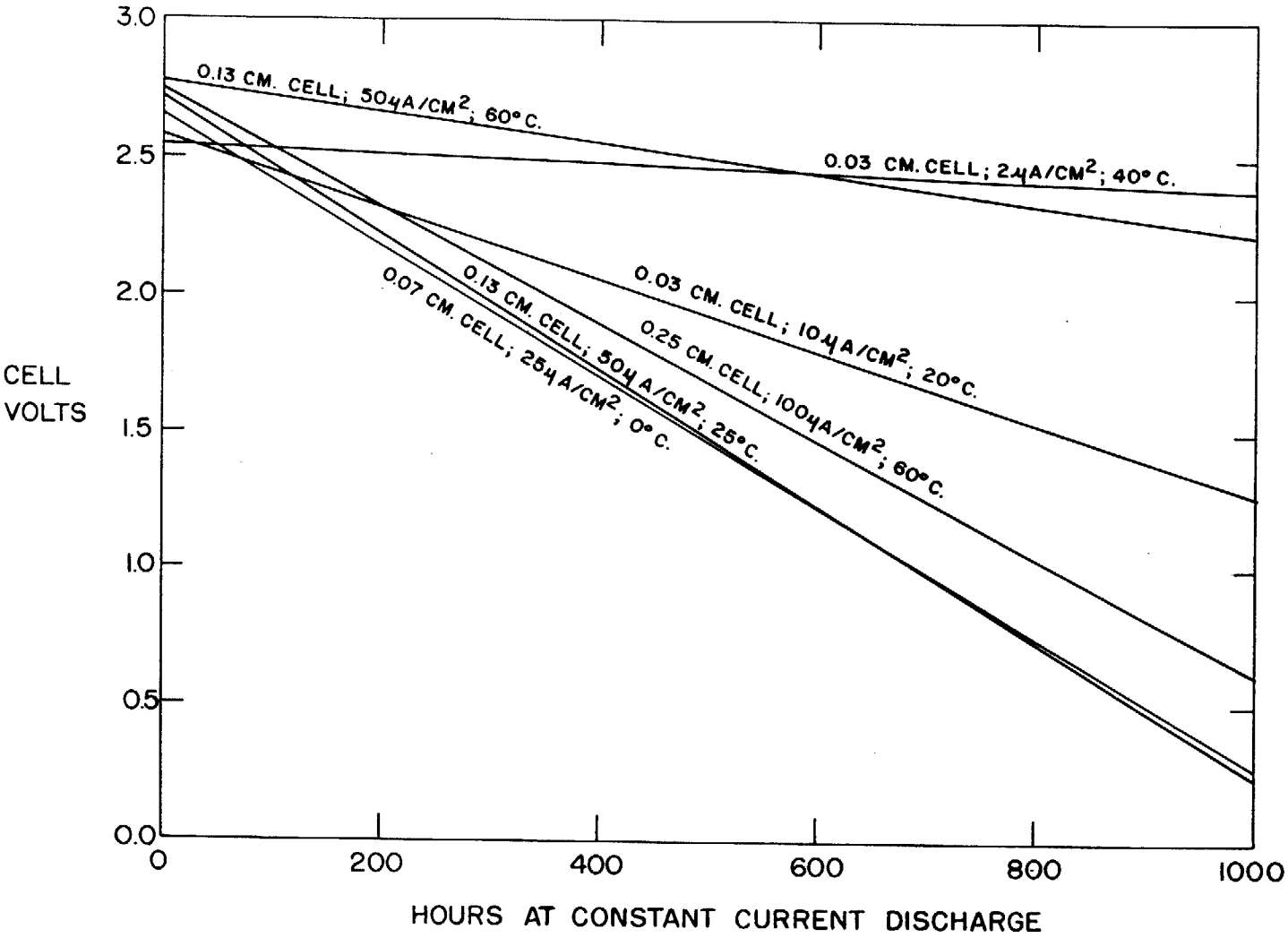

In the accompanying drawings:

FIG. 1 is a plan view of a preferred battery construction in accordance with this invention; and FIG. 2 is a vertical section, greatly enlarged, taken on line II—II of FIG. 1; and FIG. 3 is a chart showing discharge characteristics of cells made in accordance with FIG. 1.

The new cathode materials of this invention are pliable, putty-like solids containing iodine and a charge transfer complex of iodine and poly-2-vinylpyridine or poly-2-vinylquinoline. The term "plastic" used in relation to the cathode materials will refer to the pliable, putty-like physical state. The cathode materials contain from about 2 to 15 moles of $I_2$ for each atom of N.

Cells or batteries utilizing the iodine-containing cathodes of this invention have an anode reaction, $$\frac{2}{n} M \longrightarrow \frac{2M^{n+}}{n} + 2e$$

and a cathode reaction $I_2 + 2e \rightarrow 2I^-$ giving an overall reaction $$\frac{2}{n} M + I_2 \longrightarrow \frac{2}{n} MI_n$$

where M is a metal electrochemically reactive with iodine, and n is the valence of the metal. In these cells, the electrolyte is solid state metal iodide, preferably the iodide of the cathode metal, which may be formed in situ by contacting the anode and cathode surfaces. The cathode is preferably contacted against an inert current collector, suitably carbon or metal inert to the cathode. We have discovered that zirconium, platinum or alloys thereof are the most desirable materials for cathode collectors as they exhibit no apparent reaction or deterioration. Nichrome, nickle and other high nickel alloys are suitable for shorter life batteries, e.g. 4–6 months.

In the conventional preparation of charge transfer complexes of iodine with poly-2-vinylpyridine or poly-2-vinylquinoline one molecule of $I_2$ coordinates with each N atom resulting in a solid having an iodine content of about 71% by weight in the case of the poly-2-vinylpyridine complex and about 62% in the case of the poly-2-vinylquinoline complex. The new cathode compositions of the invention are a mixture of iodine and the solid poly-2-vinylpyridine·$I_2$ or poly-2-vinylquinoline·$I_2$ charge transfer complex in the desired proportions. (Throughout the specification the cathode materials may be designated by the formulas P2VP·n$I_2$ and P2VQ·n$I_2$, where P2VP is poly-2-vinylpyridine, P2VQ is poly-2-vinylquinoline and n is the number of moles of $I_2$ for each atom of N. For example, the charge transfer complex with one mole of $I_2$ per N atom is designated as P2VP·$I_2$; if four moles of $I_2$ per N atom are added, the mixture is designated P2VP·5$I_2$.)

The mixture is at ordinary ambient room temperatures a putty-like, pliable solid that is sufficiently plastic to be spread on a solid substrate, such as a sheet of anode metal. The materials are useable as cathodes in solid state cells at temperatures up to the point where softening causes loss of dimensional stability; this point may range from 20° to 75° C., or higher, depending on the degree of polymerization of the organic component of the charge transfer complex. It is believed that the plastic state of the cathode materials permits excellent atomic bonding of the cathode materials to the anode and to the cathode current collector resulting in greater outputs from a cell.

The following examples are illustrative of the preparation of the new cathode compositions, it being recognized that any methods of preparing the charge transfer complex my be used, variations in which may modify the molecular weight of the polymer component of the complex. In general, the most satisfactory cathode materials are obtained using a charge transfer complex precipitated from organic solution.

EXAMPLE I

Poly-2-vinylquinoline is prepared by the conventional method of polymerizing a benzene solution of 2-vinylquinoline using n-butylithium polymerization initiator, suitably by adding 11.3 g. of initiator (15–22% by weight in hexane) to a solution of 100 g. of 2-vinylquinoline in 1500 cc. of benzene (the solution at 45° C.) and stirring for about 10 minutes. A solution of iodine in benzene, is added in excess of stoichiometric to the poly-2-vinylquinoline solution to precipitate P2VQ·$I_2$ charge transfer complex. The presence of an excess of iodine is readily determinable by a red coloration of the mixed solutions. The precipitate is filtered, vacuum dried and mixed with between about 1 and 17 molecular weights of $I_2$ for each atomic weight of N in the complex to form a plastic, pliable solid.

EXAMPLE II

Example I is repeated except that 2-vinylpyridine is used in place of the 2-vinylquinoline. The resultant materials having the formula P2VP·n$I_2$ when n is between about 2and 7, are plastic.

It will be recognized that solutions of poly-2-vinylquinoline and poly-2-vinylpyridine may be prepared using a variety of organic solvents or conventional catalysts, such as for example the solvents toluene and hexane and the catalysts sodium metal and potassium metal. The polymers may also be prepared from aqueous solution using catalysts such as acetyl peroxide, lauroyl peroxide or methyl ethyl ketone peroxide with a cobalt naphthenate accelerator. [EXAMPLE III] [2-vinylpyridine was thermally polymerized by heating to about 80° for 8 hours. The resultant red thermoplastic material was cooled, ground to a powder, and mixed with from 20 to 40 parts of poly-2-vinylpyridine to form a plastic, pliable solid.]

The new compositions of the invention are particularly suitable as iodine-containing cathode materials because, in addition to their putty-like physical state, they exhibit a low and relatively constant electronic resistance over a wide range of iodine content and have a comparatively low electronic resistance even at extremely high iodine contents.

With proportions of between about 3 and 7 moles of $I_2$ per atom of nitrogen (or monomer unit) the electrical resistance of the new cathode material is low and substantially constant. For example, the specific resistance of P2VP·3$I_2$ prepared by the method of Example 1 is about 1400 ohm-cm.; P2VP·4$I_2$ is 1000 ohm-cm.; P2VP·5$I_2$ is 100 ohm-cm; P2VP·6$I_2$ is 930 ohm-cm; P2VP·7$I_2$ os 1400 ohm-cm. With lower iodine content, the resistance rapidly increases; for example, P2VP·2$I_2$ has a specific resistance of about 40,000 ohm-cm. With increasing iodine content above about 7 moles of $I_2$ per monomer unit, the resistance also increases; for example, the specific resistance of P2VP·8$I_2$ is 2600 ohm-cm. Thus the new cathode materials are especially advantageous in that they can provide a large amount of iodine for electrochemical reaction without greatly increasing the cell resistance because of change in the cathode composition resulting from consumption of iodine; this results in longer lived cells with higher power and energy outputs. For high current drain batteries it is preferred to use cathodes containing about 6 moles of iodine per monomer unit, as about 4 moles of iodine are available for reaction at the lowest resistance level. Higher proportions of iodine, up to 15 moles of iodine per monomer unit, are advantageously used in low current drain batteries, as a much higher energy capacity is obtained and at low current drains the polarization (IR drop) is not objectionably large.

Referring to FIG. 1 and FIG. 2, a preferred cell is enclosed in a plastic or metal housing 2, suitably a plastic envelope of polyvinyl chloride or Teflon, or a potted housing of polyester or epoxy, or a metal enclosure made from zirconium or nickel or other hermetically sealed housing that is impervious to iodine and ordinary atmospheres; that is, oxygen, nitrogen and water vapor. A thin metallic anode current collector 4, suitably nickel foil or a nickel plate deposited in the plastic housing by vacuum deposition or electroless plating, abuts a lithium electrode 6; a metal lead 8 is connected to the anode current collector for external circuit connection. The lithium is most conveniently in the form of a foil, but it may also be deposited on the current collector by vacuum deposition, electroplating or other conventional methods. When using anodes of metals with more structural strength than lithium, such as silver, magnesium or the like, the anode lead 8 may be connected directly to the anode, eliminating the anode current collector. An initial film of metal iodide electrolyte 10 may be formed spontaneously when the anode surface is brought into contact with the cathode material 12. The plastic cathode material is preferably directly applied to the cathode current collector 14, which laminate is then brought into contact with the anode. The cathode material may be also heated to melting and be applied by brushing or spraying, or be applied as a solution in tetrahydrofuran and then evaporating the solvent. If desired the cathode can be applied directly onto the anode. The cathode current collector is preferably a thin metal sheet or foil of zirconium or platinum or a coating of the metal deposited on the plastic housing although other electronic conducting material is substantially inert to the cathode may be used. Metal cathode lead 16 is connected to the cathode current collector for making external circuit connections. The stacked cell components are compressed to provide good adhesion and contact between the layers; only small pressures on the order of 25 lb./in.$^2$ are necessary to insure adhesion between layers that is maintained during storage and discharge without external force.

The cells may be made in a variety of forms, and completely encapsulated flexible cells have been made as thin as 0.020 inch, allowing batteries to be formed in almost any configuration; for example, a battery can be wrapped around electronic circuitry for efficient use of available space. When flexibility is not needed, cells can be encapsulated in rigid plastic or sealed in metal cans. Longer capacities per unit electrode area can be obtained by increasing the thickness of the anode and cathode, suitably to give cells having a thickness as much as 0.5 inch, or more. Batteries of low internal impedance are formed by stacking cells in series and parallel.

Batteries having a lithium anode and utilizing our new cathode material have exceptional storage stability, long life, high voltage output and high energy density making them especially suitable for long life, low current drain applications, such as power supplies for implanted prosthetic devices like heart pacers. The cell has a theoretical energy density of 213 w.h./lb. or 19.2 w.h./in.$^3$; actual energy densities of 136 w.h./lb. and 11.5 w.h./in.$^3$ have been measured during discharge of cells at room temperature.

Open circuit voltage for the cell is 2.87 volts. Since impedance is a function of electrolyte conductivity, a plot of cell voltage vs. current shows a linear decrease in voltage with increasing current until short circuit current is reached. Short circuit current densities as high as 20 ma./cm.$^2$ have been measured immediately after construction. At room temperature after 20 days the short circuit current decreases to 1 ma./cm.$^2$ and to 0.5 ma./cm.$^2$ after 110 days.

Under constant current discharge at relatively high current densities, voltage decay is linear with time. This behavior is illustrated in FIG. 3 for cells made in accordance with FIG. 1 having a lithium anode, a P2VP·5$I_2$ cathode and zirconium cathode collector which cell had been stored at room temperature for one week. In FIG. 3, the cell voltage is plotted against time of discharge at the indicated constant current density and various temperatures for several cells of different thickness, which is selected to provide the desired cell capacity. The cell thickness range from 0.03 cm. to 0.25 cm., the anode being about 20% and the cathode being about 80% of the cell thickness. The discharge curves generally obey the equation $$n = -C \cdot (i/A)^2 \cdot t \cdot \exp(8650/RT)$$

where $\tau$ is polarization, C is a constant dependent on cell construction, i/A is the current density, and t is time of discharge. The value 8650 calories/mole agrees with published data for the activation energy of ionic conduction in LiI. The constant C is typically $1.25 \times 10^{-4}$ ohm·cm.$^4$/amp. sec. using our new cathode material.

Discharging cells at smaller current densities results in a marked decrease in polarization. For example, if the 0.13 cm. cell in FIG. 3 was discharged (at 25° C.) at 25 $\mu$a./cm.$^2$ rather than 50 $\mu$a./cm.$^2$, cell voltage at 1000 hours would be increased from 0.24 to 2.16 volts. At 10 $\mu$a./cm.$^2$, polarization increase per thousand hours amounts to less than 100 mv. and cell life is increased by about a factor of five.

As current density is decreased, allowing cells to run for longer periods, small deviations from linearity are evident in the discharge curves, especially at higher temperatures, which are the result of self discharge.

Self discharge for the cells involves diffusion of iodine from the cathode through the electrolyte to the anode where additional electrolyte is then generated. Resistance increase resulting from this accumulation has been found to be governed by the relationship $\Omega/A = K \cdot t^{\frac{1}{2}} \cdot \exp(E/RT)$ where $\Omega$ is resistance increase per unit area and t is time. Both the pre-exponential constant K and the exponential term E have been determined for cells over a one year storage period at temperatures between −55° C. and +75° C. For lithium anode cells using $P3VP \cdot 6I_2$ cathodes, the value of K is typically $1.6 \times 10^5$ coul./cm.$^2$·sec$^{\frac{1}{2}}$ and the value of E—9950 cal./mole. After one year storage at 75° C. a typical cell having an initial impedance of 30 ohms exhibits an internal impedance of about 16,000 ohms (both values measured at this temperature). The same cell stored at 25° C. shows an internal impedance of about 11,000 ohms, having increased from 150 ohms initially.

Thus, for example, a cell only 4.45 cm.×3.50 cm.×0.93 cm., to be discharged at 30 $\mu$a. with a voltage of at least 2.3 volts at 370° C. for use in a prosthetic device has a projected life of at least 10 years. Even after long periods of storage, cells can be operated at microamphere drains for many years over a wide temperature range. In designing for very long storage period, e.g.10 years, cell thickness is increased to accomodate increased self discharge. Similar performance is obtained when using either $P2VP \cdot nI_2$ or $P2VQ \cdot nI_2$.

Although the foregoing description has been directed primarily to cells having a lithium anode, the new cathode material can be used to advantage with anodes of other metals that are reactive with iodine, for example silver or magnesium. To illustrate, a sintered silver anode 1½"×1½"×0.020" (about 50% porous) was filled with 0.036 in.$^3$ of $P2VP \cdot 5I_2$ to form a cell 0.026" thick. Contact with the cathode was effected using a zirconium cathode collector. The cell had an open circuit voltage of 0.67 volt. After 170 hours of discharge at 1450 $\mu$a. (at 24° C.) the cell voltage had dropped only to about 0.52 volt; on further discharge at the same current, the voltage dropped to zero at about 200 hours. The silver anode in this instance was a sintered mat of 0.005"×0.009"×0.125" silver needles weighing 3.7 grams. Other forms of electrodes may be used, e.g. foil, screen or electroplates, but best performance is obtained from sinters. A group of 6 cells having a silver foil anode and a $P2VQ \cdot 5I_2$ cathode, had when freshly prepared, an average life of 976 hours when discharged at 10 $\mu$a./cm.$^2$ and 25° C.; 6 identical cells after thirty days storage had an average life of 841 hours under the same discharge conditions. In contrast to the lithium cells, only about one third of the theoretical electrochemical capacity is realized in silver batteries; this is the result of the inability of the silver to conform to the growing silver iodide electrolyte causing a loss of physical contact between the anode and electrolyte.

In another example, a cell having stacked laminae of magnesium anode, $P2VP \cdot 5I_2$ cathode and zirconium cathode collector has an open circuit voltage of 0.95 volt and a short circuit current of 2 ma./cm.$^2$. When discharged at a current density of 10 $\mu$a./cm.$^2$ the cells have a life of about 50 hours.

We claim:

1. A plastic cathode consisting essentially of a mixture of iodine and a charge transfer complex of iodine with an organic donor component selected from the group consisting of poly-2-vinylquinoline and poly-2-vinylpyridine the mixture containing between about 2 and 15 molecules of iodine for each atom of nitrogen.

2. A cathode according to claim 1 containing about 6 molecules of iodine for each atom of nitrogen.

3. A primary cell comprising a metallic anode and a cathode consisting essentially of a plastic mixture of iodine and a charge transfer complex of iodine with an organic donor component selected from the group consisting of organic donor component selected from the group consisting poly-2-vinylquinoline and poly-2-vinylpyridine containing between about 2 and 15 molecules of iodine for each atom of nitrogen.

4. A cell according to claim 3 in which the anode is silver, magnesium or lithium.

5. A cell according to claim 3 having a current collector in contact with the cathode and made of a metal selected from the group consisting of zirconium, platinum, nickel or alloys thereof.

6. A cell according to claim 5 in which the anode is lithium and the cathode current collector is zirconium.

7. A cell according to claim 6 in which the cathode contains between about 2 and 6 molecules of iodine for each atom of nitrogen.

8. A cell according to claim 6 in which the cathode is a mixture of iodine and poly-2-vinylpyridine.

9. A cell according to claim 6 in which the cathode is a mixture of iodine and poly-2-vinylquinoline.

10. A primary cell comprising laminae in intimate contact sequentially arranged as follows: (1) a metallic anode, (2) an electrolyte comprising an iodide of the anode metal, (3) a cathode consisting essentially of a plastic mixture of iodine and a charge transfer complex of iodine with an organic donor component selected from the group consisting of poly-2-vinylquinoline and poly-2-vinylpyridine containing between 2 and 15 molecules of iodine for each atom of nitrogen and (4) a metal cathode current collector inert to said cathode.

11. A cell according to claim 10 having a lithium anode and a zirconium cathode current collector.

12. A cell according to claim 11 having a metallic anode current collector lamina in intimate contact with the anode.

* * * * *

UNITED STATES PATENT AND TRADEMARK OFFICE

CERTIFICATE OF CORRECTION

PATENT NO. : RE. 31,532

DATED : March 6, 1984

INVENTOR(S) : Alan A. Schneider and James R. Moser

It is certified that error appears in the above—identified patent and that said Letters Patent is hereby corrected as shown below:

Column 5, line 47, reads "370°C", should read --37°C--.

Column 6, line 6, reads "976", should read --987--.

Signed and Sealed this

*Fifth* Day of *June 1984*

[SEAL]

*Attest:*

GERALD J. MOSSINGHOFF

*Attesting Officer*

*Commissioner of Patents and Trademarks*